United States Patent [19]
Kino et al.

[11] Patent Number: 5,801,931
[45] Date of Patent: Sep. 1, 1998

[54] DC POWER SOURCE APPARATUS THAT SUPPRESSES HARMONICS

[75] Inventors: Jiro Kino, Seto; Takashi Tabei, Owariasahi; Masami Takahashi, Nagoya, all of Japan

[73] Assignee: Hitachi, Ltd., Tokyo, Japan

[21] Appl. No.: 567,661

[22] Filed: Dec. 5, 1995

[30] Foreign Application Priority Data

Dec. 6, 1994 [JP] Japan ................................. 6-301818

[51] Int. Cl.$^6$ ................................................. H02M 3/335
[52] U.S. Cl. .............................. 363/17; 363/22; 363/67; 307/82
[58] Field of Search ........................ 363/16, 17, 22, 363/23, 81, 89, 97, 124, 67; 323/222, 224, 266; 307/64, 82

[56] References Cited

U.S. PATENT DOCUMENTS

| | | | |
|---|---|---|---|
| 4,520,494 | 5/1985 | Arita et al. | 378/108 |
| 4,823,247 | 4/1989 | Tamoto | 363/16 |
| 5,247,205 | 9/1993 | Mototani et al. | 307/66 |
| 5,359,278 | 10/1994 | Notohara et al. | 323/222 |
| 5,461,263 | 10/1995 | Helfrich | 307/64 |
| 5,461,297 | 10/1995 | Crawford | 320/1 |
| 5,519,306 | 5/1996 | Itoh et al. | 323/222 |
| 5,532,914 | 7/1996 | Kageyama et al. | 363/50 |

FOREIGN PATENT DOCUMENTS

| | | |
|---|---|---|
| 4243058A | 8/1992 | Japan . |
| 681502B2 | 10/1994 | Japan . |

OTHER PUBLICATIONS

Electronics World & Wireless World, Dec. 1993, pp. 1034–1035.

A. Dmowski; C. Schwarz, *Ein primärgetaktetes Ladegerät mit sinusformigem Eingangsstrom;* der elektroniker, No. 3/1987, pp. 95–99.

JP-1-152960 (A), Patent Abstracts of Japan, Sect. E, 1989, vol. 13, No. 416 (E–821).

JP-58-151868 (A), Patent Abstracts of Japan, Sect. E, 1983, vol. 7, No. 272 (E–214).

JP-5-64441 (A), Patent Abstracts of Japan, Sect. E, 1993, vol. 17, No. 383 (E–1400).

J. Koehn, 300-W-Mehrfachstromversorgung für redundanten Parallelbetrieb, der elektroniker, No. 7, 1987, pp. 40–42.

*Primary Examiner*—Adolf Berhane
*Attorney, Agent, or Firm*—Kenyon & Kenyon

[57] ABSTRACT

An inexpensive DC power source apparatus is provided which realizes a countermeasure against high frequency and redundant operation for improving reliability by using a simplified circuit construction to thereby reduce the number of parts. An input voltage follow type current controlled boosting chopper and a current feedback type self-running inverter are used in combination, and output voltage stabilization is accomplished by utilizing the voltage stabilizing function of the boosting chopper and current balance during parallel operation is accomplished by self-balance due to an impedance drop in the self-running inverter, thereby realizing the inexpensive power source apparatus in which the number of parts is reduced.

10 Claims, 4 Drawing Sheets

5,801,931

DC POWER SOURCE APPARATUS THAT SUPPRESSES HARMONICS

BACKGROUND OF THE INVENTION

The present invention relates to a DC power source apparatus often used in an apparatus required of high reliability such as an automatic teller machine (ATM), a server computer or a fault tolerant computer.

The DC power source apparatus converts an AC current inputted from the commercial AC power supply int a DC current and delivers the DC current, thus supplying power for operating the aforementioned apparatus. The DC power source apparatus is used in the apparatus required of high reliability and therefore, in order to intensify output power or stabilize output power, power supply circuits (DC power source apparatus) are often used while being connected in parallel to each other. The DC power source apparatus of the present invention is suitable for use in redundant operation.

Redundant operation running in which power source circuits are connected in parallel is adopted with a view of improving (stabilizing) output current balance. A technique of a power source apparatus for redundant operation which has hitherto been available is shown in FIG. 5. A power source circuit includes an AC-DC converter 101 for converting an inputted AC voltage (AC IN) into a DC voltage and a DC-DC converter 102 for converting the DC voltage, which is converted by the AC-DC converter 101 and which has an unstable large level, into a stable constant DC voltage and delivering the constant DC voltage. Used as the DC-DC converter operative to deliver the voltage of a constant level is an output voltage controlled DC-DC converter having a circuit for feedback control of the output voltage. When the power source circuits are used in a redundant configuration, because of necessity to stabilize an output voltage (DC OUT) of the whole of the power source apparatus, a balance control circuit (103) is needed which detects currents delivered out of the individual power source circuits in the redundant configuration and controls the output level of the individual power source circuits in accordance with the detected currents.

As a prior art literature relevant to the redundant operation, JP-B-6-81502 is available.

On the other hand, an important problem encountered in the power source apparatus is to suppress a harmonic current interfering with the commercial power supply network and to achieve a power factor correction.

A suppression of harmonics is described in, for example, JP-A-4-243058. According to the disclosed technique, there is provided on the side of the AC-DC converter of the power source apparatus an input current corrective circuit in which an AC voltage is full-wave rectified and is then subjected to voltage transform by a booster type converter and controlled in pulse width such that an input current waveform becomes analogous to an input voltage waveform. (Generally, the power-factor correction circuit is constructed similarly and the output voltage is about 360 volts. In principle, this type of power-factor correction circuit can be supplied with AC input voltages of 100-volt system and 200-volt system and hence, setting of the output of the boosting converter to about 360 volts is effective.)

Accordingly, when power factor is desired to be improved with the power source apparatus in which the redundant operation based on parallel connection is carried out, the input current corrective circuit must be added to the AC-DC converter 101, raising a problem that the circuit construction is complicated and the cost of the power source apparatus is raised correspondingly.

SUMMARY OF THE INVENTION

An object of the present invention is to provide a DC power source apparatus suitable for redundant operation which can suppress a harmonic component.

Another object of the present invention is to provide a DC power supply system which can ensure suppression of harmonics and the redundant operation for improving reliability.

In order to achieve redundant operation with an inexpensive DC power source apparatus in which the number of parts is reduced, each power supply circuit is constructed as follows. More particularly, each power source circuit comprises in combination an AC-DC converter (an input voltage follow type current controlled chopper incorporating converter) for controlling a current waveform of an input AC current such that the current waveform approximates a voltage waveform of an input AC voltage, converting the input AC voltage into a stabilized DC voltage and delivering the DC voltage, and a self-running DC-DC converter (a current feedback type self-running inverter) for converting the DC voltage delivered out of the AC-DC converter into a DC voltage of a predetermined value or level and delivering the DC voltage of the predetermined level.

With each power source circuit constructed as above, stabilization of the output voltage of the power source circuit can be accomplished by utilizing the voltage stabilizing function of the current controlled chopper and current balance between the individual power source circuits during parallel operation can be accomplished by utilizing the self-balance function due to an impedance drop in the self-running inverter.

The applicant has confirmed through experiments that a highly reliable power source can be practiced based on the operation of the power source apparatus.

By connecting the power source circuits in parallel so that they are rendered to be suitable for redundant operation, a stable output can be produced with an inexpensive system in which the number of parts is reduced.

The AC-DC converter for controlling a current waveform of an input AC current such that it approximates a voltage waveform of an input AC voltage includes a rectifier circuit for full-wave rectifying the input AC voltage, a converter circuit connected to the rectifier circuit to convert a DC voltage delivered out of the rectifier circuit into a DC voltage of a predetermined level, and a control circuit for controlling the converter circuit to cause it to make the current waveform of the input AC current approximate the voltage waveform of the input AC voltage.

According to the present invention, the control circuit required in the prior art for keeping output currents of the DC-DC converters well balanced is not at all needed. In addition, the feedback control circuit for stabilizing the output voltage of each DC-DC circuit is also eliminated to promote reduction in the number of parts.

Further, when used for supply of power in, for example, the ATM, the DC power source apparatus of the present invention comprises a battery unit in addition to the AC power supply, and by employing a greater number of battery chargers than usually required so at to provide backup units, a DC power supply system which can be further improved in reliability can be provided.

DESCRIPTION OF THE PREFERRED EMBODIMENTS

Preferred embodiments of the present invention will be described hereunder in greater detail with reference to the accompanying drawings.

Figure 1:
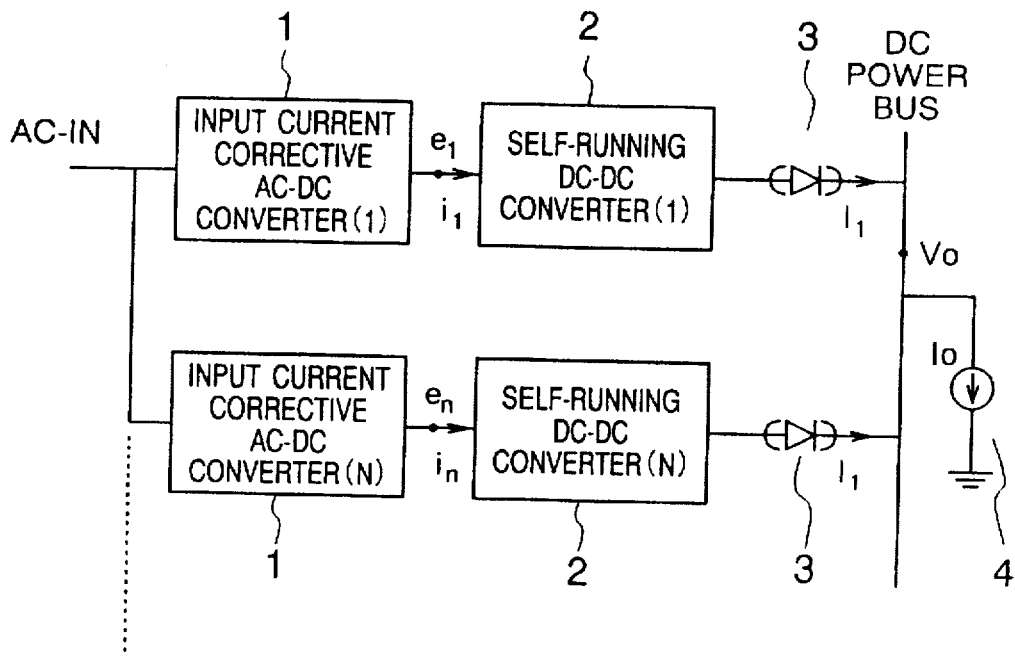
FIG. 1 shows a DC power source apparatus in redundant configuration according to the present invention.

FIG. 1 shows a configuration of DC power source apparatus according to an embodiment of the present invention in which DC power source circuits are connected in parallel with each other. In FIG. 1, reference numeral AC-IN designates an AC input voltage. Generally, an AC voltage of 100 volts at 50 Hz or 200 volts at 60 Hz is applied. Denoted by 1 is an input current corrective AC-DC converter. Its details will be described later with reference to FIG. 3. This AC-DC converter delivers a stabilized DC voltage (about 360 volts) e1. Denoted by 2 is a self-running DC-DC converter which receives the voltage e1 and delivers an isolated necessary voltage VO. Its details will be described later with reference to FIG. 3.

When output power is desired to be intensified, the individual power source circuits are connected in parallel at their AC input ports and DC output ports to permit redundant operation. Exemplarily, two circuits are connected in parallel in FIG. 1 but a greater number of circuits may be connected in parallel. Denoted by 3 is a diode which ensures improvements in reliability and maintenance. The diode plays an effective role in redundant operation.

In this configuration, parallel redundant operation may be carried out with an additional rectifier or rectifiers connected forwardly in series with the output of each power source circuit.

In the configuration shown in FIG. 1, the output voltage e1 of the input current corrective AC-DC converter 1 is fed back and stabilized by means of a control circuit (20 in FIG. 3) included in the converter 1 so that a constant voltage may be delivered even when the input voltage or the output current varies. In the self-running DC-DC converter 2, the DC voltage e1 is converted into a high-frequency AC, the high-frequency AC undergoes voltage transform through a high-frequency power transformer and a transformed voltage is rectified and smoothed, so that a DC voltage is delivered. The self-running DC-DC converter 2 does not have the function of stabilizing the output voltage but has the voltage transform function alone. Accordingly, its internal construction is very simple.

Next, details of the DC power source apparatus will be described with reference to FIG. 3.

Figure 3:
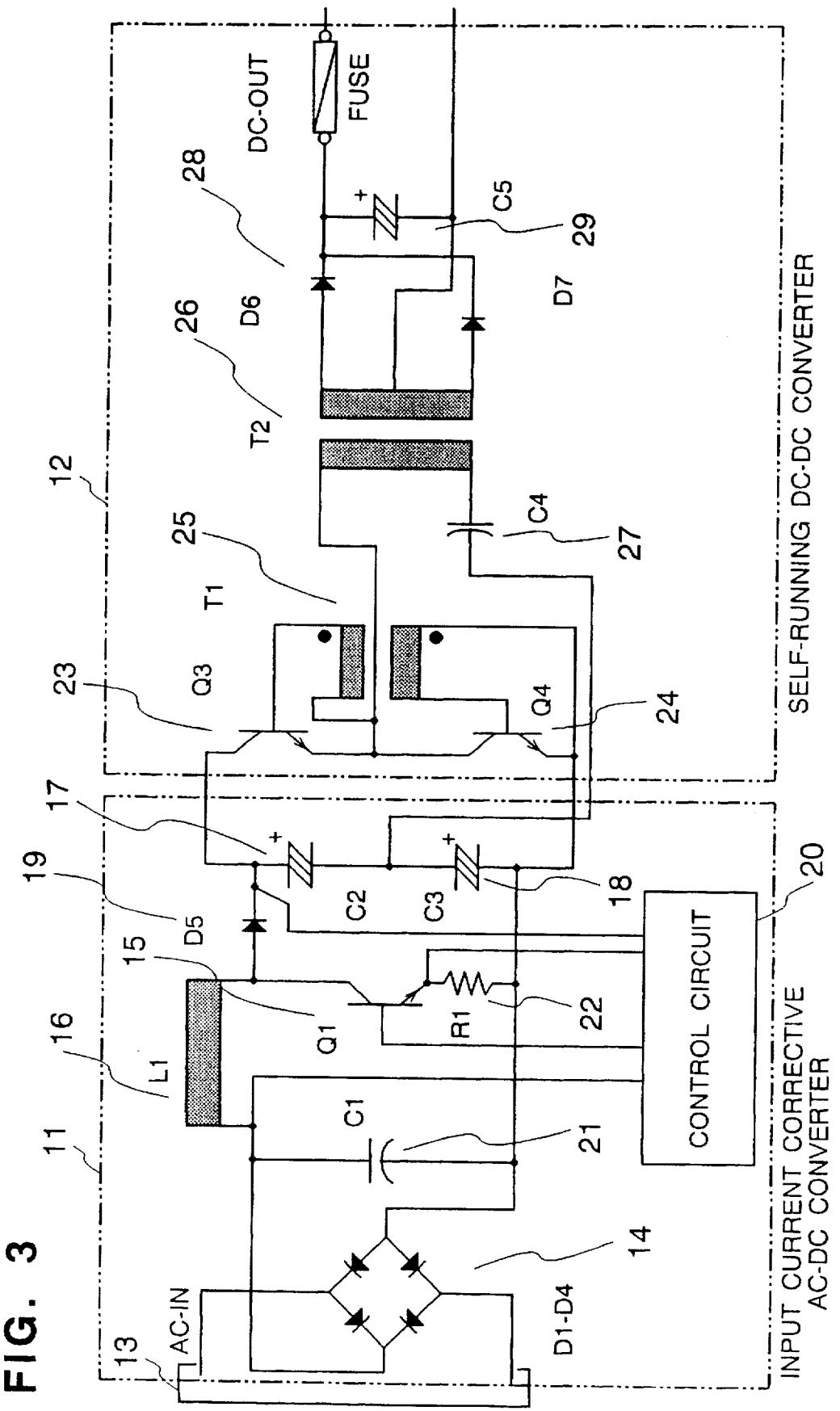
FIG. 3 shows details of the DC power supply apparatus shown in FIG. 1.

In FIG. 3, reference numeral 11 designates an input current corrective AC-DC converter and 12 a self-running DC-DC converter. A description will be given in order, beginning with the input current corrective AC-DC converter 11.

An input AC voltage is inputted from an AC voltage input port (AC-IN) 13 and is full-wave rectified by a rectifier (D1 to D4) 14. A transistor (Q1) 15, a reactor (L1) 16, a capacitor (C2) 17, a capacitor (C3) 18 and a diode (D5) constitute a boosting chopper circuit. The boosting chopper circuit is a well-known converter circuit in which energy is stored in the reactor 16 by turning on the transistor 15 and the stored energy is moved to the capacitors 17 and 18 through the diode 19 during turn-off of the transistor 15.

The on and off periods of the transistor 15 are determined by a control circuit 20. Inputted to the control circuit 20 are a full-wave rectified voltage applied to a capacitor (C1) 21, DC voltages applied to the capacitors 17 and 18, and a voltage applied to a resistor (R1) 22, i.e., a voltage value converted from an emitter current of the transistor 15.

Based on these input voltage values, the control circuit 20 on-off controls the transistor 15 such that the input current waveform (which is actually a smoothed current waveform as a result of smoothing of a sawtooth current waveform by the capacitor 21) is analogous to the AC input voltage and values of the DC voltages applied to the capacitors 17 and 18 are kept to be constant.

Further, the control circuit 20 also performs a control operation for preventing the voltage applied to the resistor 22 from becoming excessive (in other words, for ensuring that the output and input currents of this power supply apparatus can be prevented from becoming excessive).

Next, the self-running DC-DC converter 12 will be described. The self-running DC-DC converter shown in FIG. 3 is a current feedback type self-running inverter.

Transistors (Q3) 23 and (Q4) 24 alternately repeat on and off operations through the influence of a saturation phenomenon of a saturable transformer (T1) 25. More specifically, when the transistor 23 is turned on, + (plus) potential is generated at an end of a winding of saturable transformer 25 which is connected to the base of the transistor 23 and which is indicated by a polarity mark, thus keeping the transistor 23 turned on. At that time, a base current causes a current or a load current to flow from the emitter of the transistor 23 to a transformer (T2) 26 through the saturable transformer 25, thus bringing about the effect of current transformer. The transformer 25 keeps this condition until its core is saturated and at an instant that saturation is reached, the polarity is all inverted by a triggering action.

Through the above operation, a voltage across the capacitor 17 serves as an input voltage to the transformer 26 while the transistor 23 remains turned on but conversely, a voltage across the capacitor 18 serves as an input voltage to the transformer 26 while the transistor 24 remains turned on. A capacitor (C4) 27 acts to block inflow of a DC current to the transformer 26 and is applied with only a very slight AC voltage.

A voltage on the secondary side of the transformer 26 is rectified and smoothed by a rectifier (D6, D7) 28 and a capacitor (C5) 29 so as to be delivered in the form of a DC voltage. In this circuit diagram, the interior of the control circuit and part of the circuit such as a start circuit for the self-running inverter and a surge absorptive snubber are not illustrated.

With the power source apparatus of 300 W and 48 V output constructed as above, it has been confirmed that an impedance drop δ of the DC-DC converter is 10% and parallel connection can be accomplished with an output current unbalance which is within 20%. The output voltage accuracy is about 6% which is a value satisfactory for voltage stability performance of a DC power bus.

Figure 2:
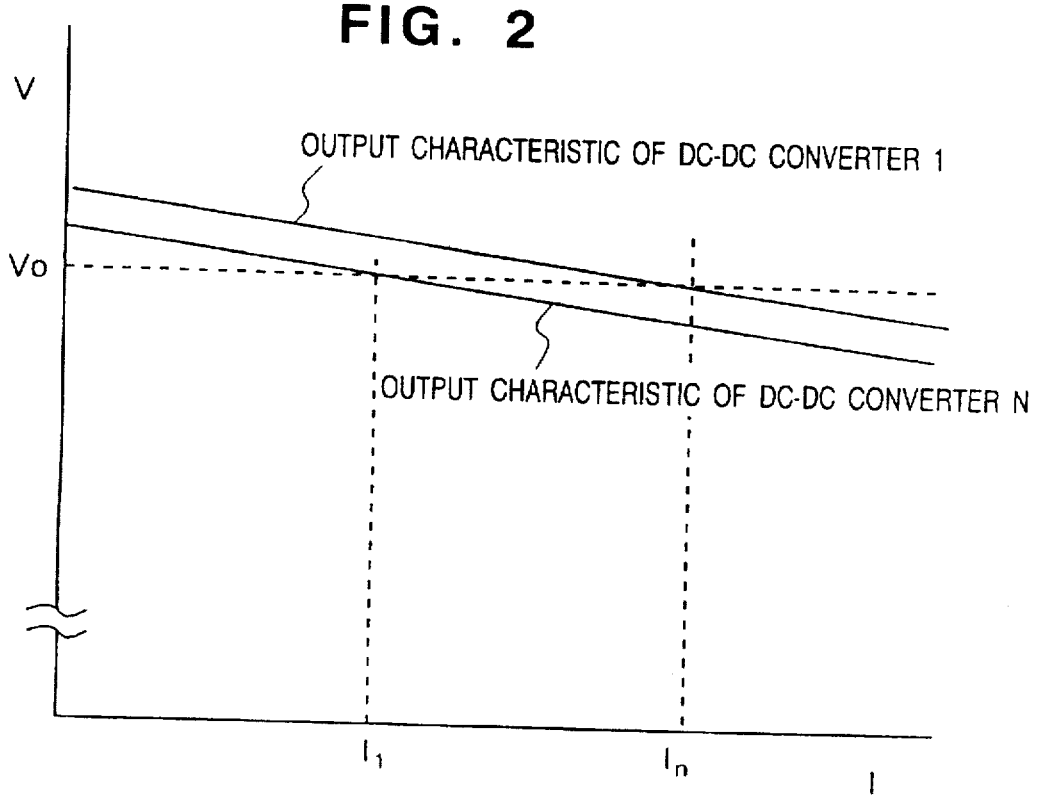
FIG. 2 shows output current/output voltage characteristics of the DC power source apparatus shown in FIG. 1.

In the configuration shown in FIG. 1, when two circuits are connected in parallel, they operate in a manner as graphically shown in FIG. 2. In FIG. 2, abscissa represents current and ordinate voltage. Two self-running DC-DC converters 2 are connected in parallel and when each converter alone operates, that is, the parallel connection is released, output characteristics as shown at solid line can be obtained.

The self-running DC-DC converter 2 does not have the function of stabilizing the output voltage and therefore, it has a so-called impedance drop characteristic in which as the output current increases, the output voltage decreases. The output voltages (inclusive of the aforementioned impedance drops) are proportional to input voltages e1 and en and consequently, when the output voltages e1 and en are not equal to each other, the corresponding output voltages shift from each other and two substantially straight solid lines as shown in FIG. 2 are obtained.

Returning to FIG. 1, the parallel connection will be considered again. With the self-running DC-DC converters 2 connected in parallel, an output voltage VO which is in common to these converters 2 is produced and an output current IO is the sum of output currents I1 and In of the respective self-running DC-DC converters 2. In other words, these converters stabilize at an operating point shown at dotted line in FIG. 2.

This relation can be indicated by mathematical expressions as below.

Here, an impedance which is a cause of the aforementioned impedance drop is defined as RO and it is assumed that the two self-running DC-DC converters 2 have the same RO and a voltage transform ratio A is also the same for the two self-running DC-DC converters 2.

$$VO = e1 \times A - I1 \times RO \qquad (1)$$
$$= en \times A - In \times RO$$

$$In/I1 = 1 - ((e1-en) \times A)/(RO \times I1) \qquad (2)$$

Where (e1−en)/e1 is an output voltage deviation $\Delta$ and (RO×I1)/(e1×A) is an impedance drop $\delta$, $$In/I1 = 1 - \Delta/\delta \qquad (3)$$

stands.

Namely, the current unbalance during parallel connection is determined by the ratio between the output voltage deviation $\Delta$ of the input current corrective AC-DC converter 1 and the impedance drop $\delta$ of the self-running DC-DC converter 2. Accordingly, by setting this ratio properly, an intended current share during parallel connection can be determined.

In the foregoing, a description has been given by way of two circuits in parallel connection but even when a greater number of circuits are connected in parallel, a current share can be determined based on the same principle.

Figure 4:
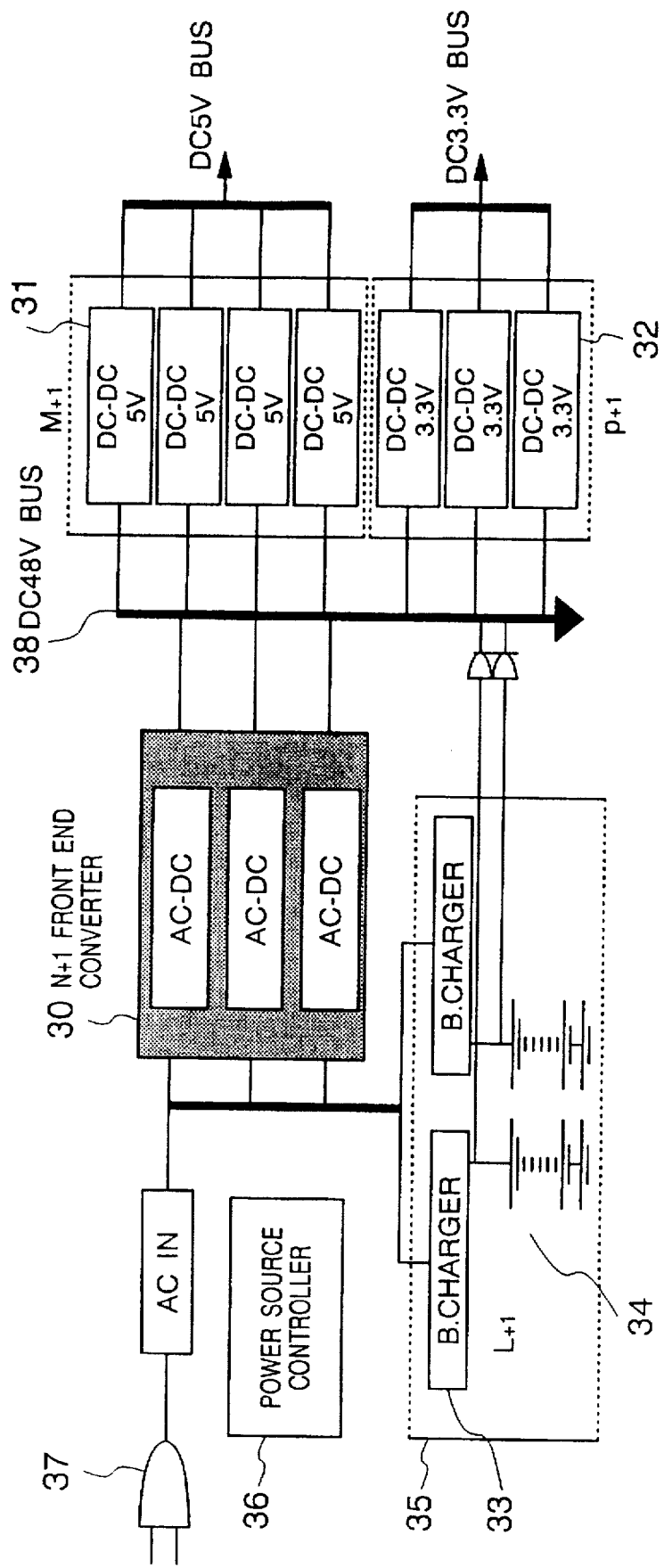
FIG. 4 shows a system to which the DC power source apparatus of the present invention is applied.
Figure 5:
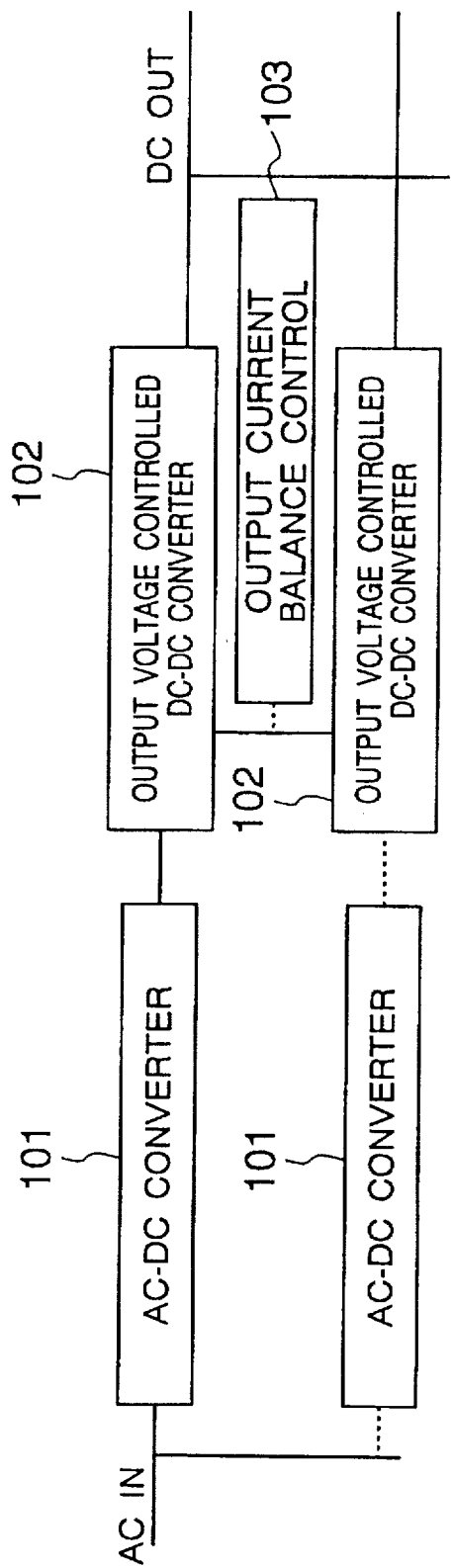
FIG. 5 show a conventional DC power source apparatus in redundant configuration.

FIG. 4 shows a power supply system to which the power source apparatus of the present invention is applied.

In FIG. 4, an N+1 front end converter 30 corresponds to the power source apparatus shown in FIG. 1, including three power source circuits, for example. In this power supply system, an AC voltage inputted from a power supply plug 37 is converted into a stable DC voltage of 48 volts by means of the N+1 front end converter 30 and the DC voltage is delivered to a DC48V bus 38. The delivered 48-volt DC voltage is used for mechanical operation such as rotation of a motor in an ATM or a server. The DC48V bus 38 is in turn connected to a DC-DC converter group 31 and a DC-DC converter group 32. The DC-DC converter group 31 converts the 48-volt DC voltage into a DC voltage of 5 volts.

The DC-DC converter group 32 converts the 48-volt DC voltage into a DC voltage of 3.3 volts. The system as above can supply DC voltages for various utilization to apparatuses.

Two sets of battery 34 and battery charger 33 are connected to the AC voltage input side. A power source controller 36 monitors a voltage being inputted and the supply of sufficient power cannot be sustained, it controls the batteries such that they supply power. When apparatuses connected to the present power supply system require N power source circuits of the front end converter 30, M DC-DC converters 31, P DC-DC converters 32 and L battery charger units 35 during normal operation, the number of these components is added by one to secure higher reliability.

As described above, by using the input current corrective AC-DC converters and the self-running DC-DC converters in simple combination, an inexpensive power supply system which can permit the suppression of harmonics can be provided.

We claim:

1. A DC power source apparatus for receiving an AC voltage and delivering a DC voltage, comprising:

an AC-DC converter including a rectifier circuit for full-wave rectifying the input AC voltage, a chopper circuit having a reactor and a first transistor, and a drive control circuit for receiving a pulsating DC voltage subject to rectification by said rectifier circuit, an emitter current of said first transistor and an output voltage of said chopper circuit and controlling on and off periods of said first transistor to cause a waveform of the emitter current of said first transistor to approximate a waveform of the input AC voltage and to make the output voltage of said chopper circuit constant; and a self-running inverter including a group of second transistors and a circuit for driving said second transistor group, an insulating transformer for receiving an output of said second transistor group and performing transform of voltage value, and a circuit for rectifying and smoothing an output of said insulating transformer.

2. A DC power source apparatus comprising:

an AC-DC converter for controlling a current waveform of an input AC current such that it approximates a voltage waveform of an input AC voltage, converting the input AC voltage into a stabilized first DC voltage and delivering the first DC voltage, said AC-DC converter rectifying the input AC voltage and controlling on and off periods of a transistor in a converter circuit to cause a waveform of an emitter current of the transistor to approximate the voltage waveform of the input AC voltage and to make the output voltage of the converter circuit constant; and a self-running DC-DC converter for transforming the first DC voltage into a second DC voltage of a predetermined value and delivering the second DC voltage.

3. A DC power supply system comprising:

a plurality of DC power source apparatuses which are connected in parallel to each other, each of said apparatuses comprising:

an AC-DC converter for controlling a current waveform of an input AC current such that it approximates a voltage waveform of an input AC voltage, converting the input AC voltage into a stabilized first DC voltage and delivering the first DC voltage, said AC-DC converter rectifying the input AC voltage and controlling on and off periods of a transistor in a converter circuit to cause a waveform of an emitter current of the transistor to approximate the voltage waveform of the input AC voltage and to make the output voltage of the converter circuit constant; and a self-running DC-DC converter for transforming the first DC voltage into a second DC voltage of a predetermined value and delivering the second DC voltage.

4. A DC power source apparatus comprising according to claim 2, wherein said AC-DC converter includes:

a rectifier circuit for full-wave rectifying the input AC current;

the converter circuit connected to said rectifier circuit to convert a third DC voltage delivered out of said rectifier circuit into said first DC voltage of a predetermined value; and a control circuit for controlling said converter circuit to cause it to make a current waveform of the input AC current approximate a voltage waveform of the input AC voltage.

5. A DC power supply system comprising:

a connection port for connection to an AC power supply;

a plurality of DC power source circuits connected in parallel to said connection port and each including an AC-DC converter for controlling a current waveform of an input AC current inputted from said connection port such that it approximates a voltage waveform of an input AC voltage, converting the input AC voltage into a stabilized first DC voltage and delivering the first DC voltage, said AC-DC converters rectifying the input AC voltage and controlling on and off periods of a transistor in a converter circuit to cause a waveform of an emitter current of the transistor to approximate the voltage waveform of the input AC voltage and to make the output voltage of the converter circuit constant; and a self-running DC-DC converter for transforming the first DC voltage into a second DC voltage of a predetermined value and delivering the second DC voltage;

a DC power source bus for receiving parallel outputs from said plurality of DC power source circuits; and first and second DC-DC converters connected to said DC power source bus.

6. A DC power supply system according to claim 5, further comprising a backup power supply.

7. A DC power supply system according to claim 6, further comprising a charger for receiving power from said AC power supply to charge said backup power supply.

8. A DC power supply system according to claim 7, wherein a plurality of chargers are provided.

9. A DC power source apparatus comprising:

a rectifier circuit for rectifying an input AC current;

a first converter circuit connected to said rectifier circuit to convert a first DC voltage delivered out of said rectifier circuit into a second DC voltage of a predetermined value;

a control circuit for controlling said first converter circuit by controlling on and off periods of a transistor in said first converter circuit to cause a waveform of an emitter current of the transistor to approximate a voltage waveform of the input AC voltage;

a second converter circuit for transforming an output of said first converter circuit into another voltage value different from said predetermined value; and a smoothing circuit for rectifying and smoothing an output of said second converter circuit and delivering a DC voltage.

10. A DC power supply system comprising:

a plurality of DC power source apparatuses which are connected in parallel to each other, each of said apparatuses comprising:

a rectifier circuit for rectifying an input AC current;

a first converter circuit connected to said rectifier circuit to convert a first DC voltage delivered out of said rectifier circuit into a second DC voltage of a predetermined value;

a control circuit for controlling said first converter circuit by controlling on and off periods of a transistor in said first converter circuit to cause a waveform of an emitter current of the transistor to approximate a voltage waveform of the input AC voltage;

a second converter circuit for transforming an output of said first converter circuit into another voltage value different from said predetermined value; and a smoothing circuit for rectifying and smoothing an output of said second converter circuit and delivering a DC voltage.

* * * * *

UNITED STATES PATENT AND TRADEMARK OFFICE
CERTIFICATE OF CORRECTION

PATENT NO. : 5,801,931
DATED : 1 September 1998
INVENTOR(S) : Jiro KINO et al.

It is certified that error appears in the above-identified patent and that said Letters Patent is hereby corrected as shown below:

| Column | Line | |
|---|---|---|
| 3 | 22 | Change "1" to --1--. |
| 3 | 25 | Change "2" to --2--. |
| 3 | 34 | Change "3" to --3--. |
| 3 | 48 | Change "e1" to --e1--. |

Signed and Sealed this

Eighteenth Day of May, 1999

Attest:

Attesting Officer

Q. TODD DICKINSON

Acting Commissioner of Patents and Trademarks